United States Patent
Zhang et al.

(10) Patent No.: US 9,990,067 B2
(45) Date of Patent: Jun. 5, 2018

(54) EVOLUTIONARY TOUCH-BASED GRAPHICAL USER INTERFACE FOR ELECTRONIC DEVICES

(71) Applicant: Tracfone Wireless, Inc., Miami, FL (US)

(72) Inventors: Ming Zhang, Miami, FL (US); Sze Ho Wong, Miami, FL (US); Sergio Rivera, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days. days.

(21) Appl. No.: 15/664,478

(22) Filed: Jul. 31, 2017

(65) Prior Publication Data

US 2017/0329430 A1  Nov. 16, 2017

Related U.S. Application Data

(63) Continuation of application No. 13/567,627, filed on Aug. 6, 2012, now Pat. No. 9,720,527.

(51) Int. Cl.
*G06F 3/048* (2013.01)
*G06F 3/041* (2006.01)

(52) U.S. Cl.
CPC ............. *G06F 3/041* (2013.01); *G06F 3/048* (2013.01)

(58) Field of Classification Search
None
See application file for complete search history.

(56) References Cited

U.S. PATENT DOCUMENTS

| | | |
|---|---|---|
| 5,235,679 A | 8/1993 | Yoshizawa et al. |
| 5,390,281 A | 2/1995 | Luciw et al. |
| 5,465,358 A | 11/1995 | Blades et al. |
| 5,673,405 A | 9/1997 | Tange |

(Continued)

FOREIGN PATENT DOCUMENTS

| | | |
|---|---|---|
| WO | 2000008556 A1 | 2/2000 |
| WO | 2002029760 A2 | 4/2002 |

OTHER PUBLICATIONS

Erik G. Nilsson, "Design Patterns for User Interface for Mobile Applications" SINTEF ITC, Postboks 124, Blindem, N-0314, Oslo, Norway, pp. 1-6.

(Continued)

*Primary Examiner* — Jennifer Mehmood
*Assistant Examiner* — Carl Adams
(74) *Attorney, Agent, or Firm* — Baker Hostetler LLP

(57) ABSTRACT

An electronic device having a customizable interface includes a processor configured to execute instructions and a display device configured to generate an interface based in part in response to the processor. The electronic device further includes a touch screen associated with the display device and configured to sense a user input with respect to a plurality of objects, wherein the input is provided to the processor. The processor further configured to determine at least one of a physical aspect of the user input and a frequency of an interaction with each of the plurality objects displayed on the touch screen. The processor further configured to modify a manner in which the plurality objects are displayed on the display device based on the determination of at least one of the physical aspects of the user input and the frequency of interaction with the plurality of objects.

17 Claims, 6 Drawing Sheets

(56) References Cited

U.S. PATENT DOCUMENTS

| | | | |
|---|---|---|---|
| 5,760,774 | A | 6/1998 | Grossman et al. |
| 6,233,570 | B1 | 5/2001 | Horvitz et al. |
| 7,827,495 | B2 | 11/2010 | Bells et al. |
| 2009/0007017 | A1* | 1/2009 | Anzures .............. G06F 3/04883 715/835 |
| 2009/0164923 | A1 | 6/2009 | Ovi |
| 2009/0172562 | A1* | 7/2009 | Lai ...................... G06F 3/04817 715/745 |
| 2010/0269039 | A1 | 10/2010 | Pahlavan et al. |
| 2012/0313962 | A1 | 12/2012 | Hsu et al. |
| 2013/0014040 | A1 | 1/2013 | Jagannathan et al. |
| 2013/0024815 | A1 | 1/2013 | O |
| 2013/0120278 | A1 | 5/2013 | Cantrell |
| 2014/0013271 | A1 | 1/2014 | Moore et al. |

OTHER PUBLICATIONS

Sus Lundgren et al., "Alchemy: Dynamic Gesture Hinting for Mobile Devices" Interaction Design, Dept. of Applied Information Technology, Univ. of Gothenberg, Sweden; Copyright 2011; MindTrek'11, Sep. 28-30, 2011, Tampere, Finland.

* cited by examiner

EVOLUTIONARY TOUCH-BASED GRAPHICAL USER INTERFACE FOR ELECTRONIC DEVICES

CROSS REFERENCE TO PRIOR APPLICATIONS

This application is a continuation of the U.S. patent application Ser. No. 13/567,627, filed Aug. 6, 2012 now U.S. Pat. No. 9,720,527 issued Aug. 1, 2017, which is incorporated herein by reference in its entirety.

BACKGROUND OF THE DISCLOSURE

1. Field of the Disclosure

This disclosure relates generally to a device and a process to provide a touch-based input graphical user interface with evolutionary customizable characteristics. More particularly, the disclosure relates generally to a device and a process to provide a touch-based input graphical user interface that evolves various characteristics of the graphical user interface based on use by the user.

2. Related Art

Many electronic devices have touch-based graphical user interfaces. These electronic devices can include wireless devices, mobile phones, tablet computers, gaming devices, MP3 players, and the like. Touch-based graphical user interfaces are a substantial improvement over prior approaches to providing input to electronic devices. For example, they have the ability to provide input capability based on images and graphics that may be varied. The touch-based graphical user interface greatly benefits from being customizable by the user. The customization may include location of icons and the like. However, the customization process often requires the user to execute a setting process wherein the user has to provide certain input to modify and customize the various aspects of the touch-based graphical user interface. For example, the user may have to go through a multiscreen question and answer process and/or may include the selection of various parameters in order to complete the customization process. In other cases, the user has to go into a settings aspect or control panel aspect of the electronic device in order to adjust, modify, and customize the various aspects of the touch-based graphical user interface. This usually requires the user to navigate multiple tabs, operate pulldown boxes, make a plurality of selections, and/or the like.

As users often are not sure what settings they would like to adjust, modify, and customize, the resulting so-called customized graphical user interface obtained through the process described above or the like is less than optimal as the users do not know what to modify and/or how to modify the graphical user interface such that the resulting graphical user interface is optimal. Moreover, users are often busy and do not have time to go through the tedious process of going into a settings process, control panel, modification process or deal with a program that will query the user on what modifications can be made and/or are to be made. Furthermore, such processes to customize the electronic device can be a frustrating and bothersome for the user. The result is that the user is often not customizing or using the electronic device in a manner that would provide the most efficient, beneficial, and/or enjoyable experience with the electronic device.

Accordingly, there is a need for a system and process to customize aspects of a touch-based graphical user interface for electronic devices that provides and/or customizes automatically based on use of the electronic device by a user.

SUMMARY OF THE INVENTION

The foregoing needs are met, to a great extent, by the invention, with a process and device for implementing a touch-based graphical user interface for electronic devices having the ability to be modified and/or customized in an evolutionary manner.

In one or more aspects, an electronic device having a customizable interface includes a processor configured to execute instructions, a display device configured to generate an interface based in part in response to the processor, wherein the display device is further configured to generate the interface to display a plurality objects, a touch screen associated with the display device and configured to sense a user input with respect to the plurality of objects, wherein the input is provided to the processor, a memory configured to store the instructions to operate the electronic device, the processor further configured to determine at least one of a physical aspect of the user input and a frequency of an interaction with each of the plurality objects displayed on the touch screen, and the processor further configured to modify a manner in which the plurality objects are displayed on the display device based on the determination of at least one of the physical aspects of the user input and the frequency of interaction with the plurality of objects.

The physical aspect of the user input determined by the processor may include at least one of the physical contact area of the user with respect to the touchscreen, a physical contact area of a device operated by the user with respect to the touchscreen, and the manner in which the user contacts the touchscreen. The frequency of interaction with the plurality of objects determined by the processor may include determining a frequency of use of each object of the plurality of objects. The plurality of objects may include at least one of icons and applications. The electronic may be configured to display multiple screens, with only one screen visible at a given time, the display further configured to display a portion of the plurality of objects on each of the multiple screens. The electronic device may include at least one of a wireless phone, mobile phone, user equipment, MP3 player, gaming device, tablet computer, smartphone, and personal digital assistant. The modification of the manner in which the plurality of objects maybe displayed includes modifying at least one of a size of the object, a shape of the object, a color of the object, a position of the object, a font of the object, and a visual aspect of the object. The processor may be configured to not change the manner in which the plurality of objects are displayed based on a determination that a modification is not needed. The electronic device further may include at least one of an audio input device, audio output device, power supply, touchscreen controller, and a transceiver.

In a further aspect the invention a process of customizing an interface of an electronic device includes generating an interface on a display device and further generating on the interface display a plurality objects, sensing a user input on a touch screen associated with the display device with respect to the plurality of objects, storing instructions to operate the electronic device in a memory, determining at least one of a physical aspect of the user input and a frequency of an interaction with each of the plurality objects displayed on the touch screen, and modifying a manner in which the plurality objects are displayed on the display device based on the determination of at least one of the physical aspects of the user input and the frequency of interaction with the plurality of objects.

The physical aspect of the user input may include at least one of the physical contact area of the user with respect to the touchscreen, a physical contact area of a device operated by the user with respect to the touchscreen, and the manner in which the user contacts the touchscreen. The frequency of interaction with the plurality of objects may include determining a frequency of use of each object of the plurality of objects. The plurality of objects may include at least one of icons and applications. The process may include displaying multiple screens, with only one screen visible at a given time, wherein the displaying displays a portion of the plurality of objects on each of the multiple screens. The modifying may include at least one of modifying a size of the object, a shape of the object, a color of the object, a position of the object, a font of the object, and a visual aspect of the object.

In yet another aspect of the invention an electronic device having a customizable interface includes means for generating an interface on a display device and for further generating on the interface display a plurality objects, means for sensing a user input on a touch screen associated with the display device with respect to the plurality of objects, means for storing instructions to operate the electronic device in a memory, means for determining at least one of a physical aspect of the user input and a frequency of an interaction with each of the plurality objects displayed on the touch screen, and means for modifying a manner in which the plurality objects are displayed on the display device based on the determination of at least one of the physical aspects of the user input and the frequency of interaction with the plurality of objects.

The physical aspect of the user input determined by the means for determining may include at least one of the physical contact area of the user with respect to the touchscreen, a physical contact area of a device operated by the user with respect to the touchscreen, and the manner in which the user contacts the touchscreen. The frequency of interaction with the plurality of objects determined by the means for determining may include a frequency of use of each object of the plurality of objects. The plurality of objects may include at least one of icons and applications. The display device may be further configured to display multiple screens, with only one screen visible at a given time, the display further configured to display a portion of the plurality of objects on each of the multiple screens. The electronic device may include at least one of a wireless phone, mobile phone, user equipment, MP3 player, gaming device, tablet computer, smartphone, and personal digital assistant. The means for modifying may modify at least one of a size of the object, a shape of the object, a color of the object, a position of the object, a font of the object, and a visual aspect of the object.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Reference in this specification to an electronic device is intended to encompass devices such as wireless devices, mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Wireless devices may connect to a "wireless network" or "network" and are intended to encompass any type of wireless network to obtain mobile phone services through the use of a wireless device, such as the Global System for Mobile Communication (GSM) network, Code-Division Multiple Access (CDMA) network or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
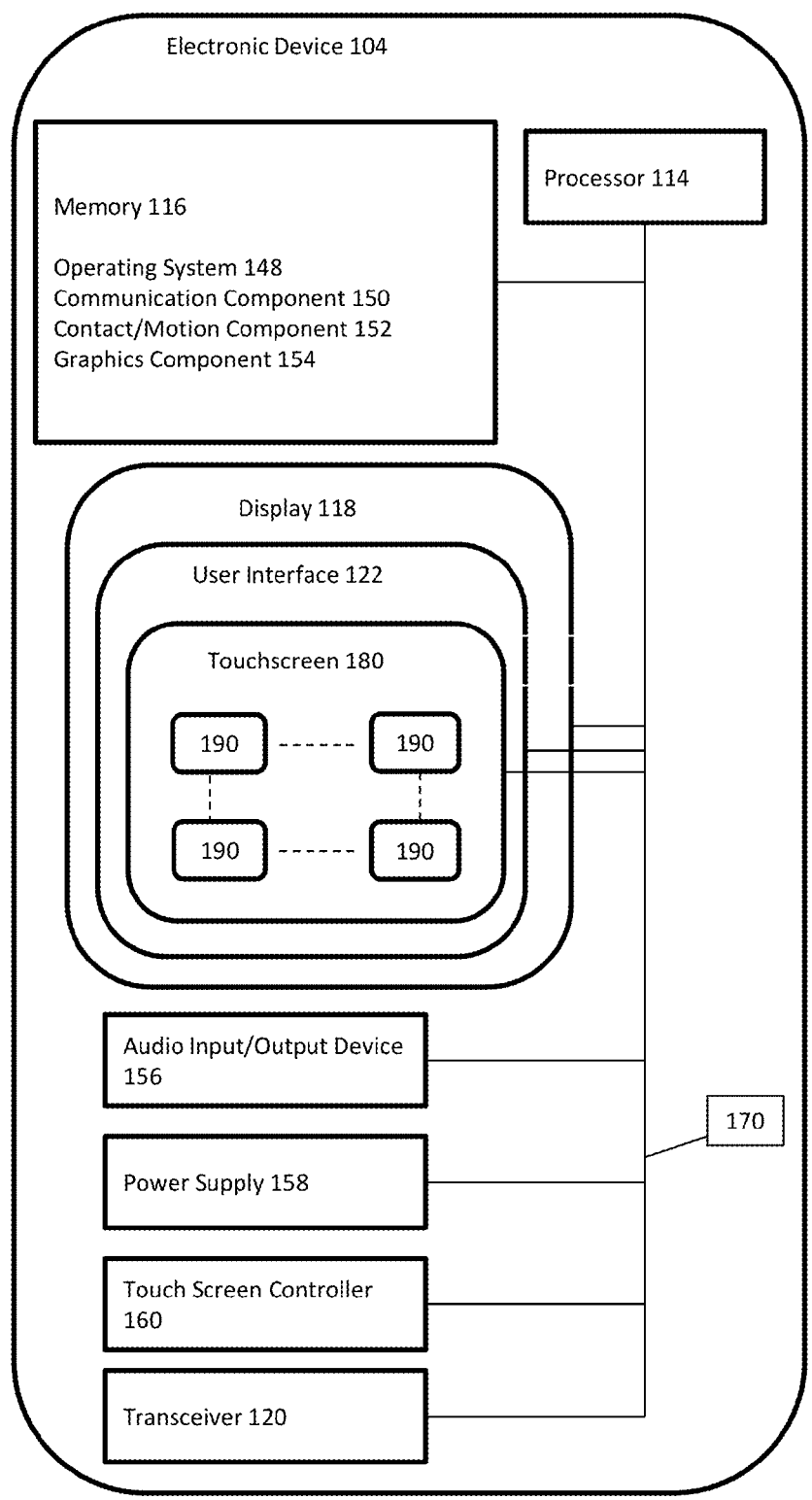
FIG. 1 shows the details of an exemplary electronic device in accordance with aspects of the invention.

FIG. 1 shows the details of an exemplary electronic device in accordance with aspects of the invention. The electronic device 104 includes a processor 114, memory 116, display 118, user interface 122, and the like. The processor 114 may be a central processing unit configured to execute instructions including instructions related to software programs. The display 118 may be a liquid crystal display having a backlight to illuminate the various color liquid crystals to provide a colorful display. The user interface 122 may be any type of physical input having buttons and further may be implemented as a touchscreen 180.

The electronic device 104 may further include in the memory 116, an operating system 148, a communication component 150, a contact/motion component 152, a graphics component 154 and the like. The operating system 148 together with the various components providing software functionality for each of the components of the electronic device 104.

The memory 116 may include a high-speed random-access memory. Also, the memory 116 may be a non-volatile memory, such as magnetic fixed disk storage, flash memory or the like. These various components may be connected through various communication lines including a data bus 170.

Additionally, the electronic device 104 may include an audio input/output device 156. The audio input/output device 156 may include speakers, speaker outputs, and in the like, providing sound output; and may include microphones, microphone inputs, and the like, for receiving sound inputs. The audio input/output device 156 may include and analog to digital converter and a digital to audio converter for audio input and output functions respectively.

When implemented as a wireless device, the electronic device 104 may include a transceiver 120 and the like. The electronic device 104 may provide radio and signal processing as needed to access a network for services. The processor 114 may be configured to process call functions, data transfer, and the like and provide other services to the user.

The touchscreen 180 of the invention may be implemented in the display 118 and may detect a presence and location of a touch of a user within the display area. For example, touching the display 118 of the electronic device 104 with a finger or hand. The Touchscreen 180 may also sense other passive objects, such as a stylus.

In operation, the display 118 may display various objects 190 associated with applications for execution by the processor 114. In this regard, a user may touch the display 118, and in particular the touchscreen 180, to interact with the objects 190. For example touching an object 190 may execute an application in the processor 114 associated with the object 190 that is stored in memory 116. Additionally or alternatively, touching an object 190 may open a menu of options to be selected by the user. The display 118 may include a plurality of the objects 190 for the user to interact with. Moreover the display 118 may include a plurality of screens. The display 118 showing one screen at a time. The user may interact with the display 118 to move a screen into view on the display 118. Various objects 190 may be located in the each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

When the touchscreen 180 is implemented as a resistive touchscreen panel it may include several layers. It may include two thin, transparent electrically-resistive layers separated by a thin space. These layers may face each other, with a thin gap between. A top screen or the screen which experiences the users touch may have a coating on the underside surface of the touchscreen 180. Beneath this layer may be a similar resistive layer on top of its substrate. One layer may have conductive connections along its sides, the other along top and bottom. A voltage may be passed through one layer, and sensed at the other. When an object, such as a fingertip or stylus tip, presses down on the outer surface, the two layers touch to become connected at that point. Accordingly, the touchscreen 180 may then behave as a pair of voltage dividers, one axis at a time. By rapidly switching between each layer, the position of a pressure on the screen can be read.

The touchscreen 180 may be implemented with surface acoustic wave (SAW) technology. SAW technology may use ultrasonic waves that pass over the touchscreen 180. When the touchscreen 180 is touched, a portion of the wave may be absorbed. This change in the ultrasonic waves registers the position of the touch event and sends this information to the controller for processing.

The touchscreen 180 may be implemented with capacitive touchscreen panel. A capacitive touchscreen panel may include an insulator such as glass, coated with a transparent conductor such as indium tin oxide. As the user's body is also an electrical conductor, touching the surface of the screen results in a distortion of the screen's electrostatic field, measurable as a change in capacitance. The location is then sent to the processor 114 for processing. Only one side of the insulator may be coated with a conductive layer. A small voltage may be applied to the layer, resulting in a uniform electrostatic field. When a conductor, such as a human finger, touches the uncoated surface, a capacitor is dynamically formed. The processor 114 can determine the location of the touch indirectly from the change in the capacitance as measured from the four corners of the panel.

The touchscreen 180 may be implemented as a projected capacitive touch (PCT) device. The PCT touch screen may be made up of a matrix of rows and columns of conductive material, layered on sheets of glass. This can be manufactured either by etching a single conductive layer to form a grid pattern of electrodes, or by etching two separate, perpendicular layers of conductive material with parallel lines or tracks to form a grid. Current applied to this grid creates a uniform electrostatic field, which can be measured. When a conductive object, such as a finger, comes into contact with a PCT touchscreen, it distorts the local electrostatic field at that point. This is measurable as a change in capacitance. If a finger bridges the gap between two of the tracks, the charge field is further interrupted and detected by the processor 114. The capacitance can be changed and measured at every individual point on the grid.

The touchscreen 180 may be implemented with self-capacitance sensors. Self-capacitance sensors may have an X-Y grid with columns and rows that operate independently. With self-capacitance, the capacitive load of a finger is measured on each column or row electrode by a current meter.

The touchscreen 180 may be implemented with infrared sensors. Infrared sensors may be mounted around the display to sense for a user's touchscreen input. An infrared touchscreen may use an array of X-Y infrared LED and photodetector pairs around the edges of the screen to detect a disruption in the pattern of LED beams. These LED beams cross each other in vertical and horizontal patterns. Two or more image sensors are placed around the edges of the screen. Infrared back lights may be placed in a camera's field of view on the other side of the screen. A touch shows up as a shadow and each pair of cameras can then be pinpointed to locate the touch or even measure the size of the touching object.

The touchscreen 180 may be implemented with dispersive signal technology. Dispersive signal technology may use sensors to detect the piezoelectricity in the glass that occurs due to a touch. Algorithms executed by the processor 114 then interpret this information and provide the actual location of the touch.

The touchscreen 180 may be implemented with acoustic pulse recognition. In this aspect, a touch at each position on the glass generates a unique sound. Transducers attached to the edges of the touchscreen glass pick up the sound of the touch. The sound is then digitized by the processor 114 and compared to a list of prerecorded sounds for every position on the glass.

The electronic device 104 includes a system and process for customization of interface aspects of the display 118. In particular, the interface aspects may include the size, color, arrangement, font attributes, shape, shape attributes, and the like, of the objects 190 that are arranged on a screen of the display 118. Additionally or alternatively, the interface aspects may include the location of the objects 190 on a particular screen of the plurality of screens.

The customization of the interface aspects may be based on the use of the electronic device 104 by the user. The use may include how the user uses the touchscreen 180, which objects 190 are used, how often the objects 190 are used and how the user physically touches the touchscreen 180.

The manner in which it is determined how the user physically touches the touchscreen 180 may be based on the sensed touching of the touchscreen 180. In this regard, the touchscreen 180 may be configured to sense the touch of a user as noted above. This ability to sense the touch of the user may include being able to determine the size of the surface the user touches on the touchscreen 180. For example, a user with smaller fingers, a stylus user, or user that is uses a smaller portion of their finger will be sensed by the touchscreen 180 in conjunction with the processor 114 as having a smaller physical contact surface. On the other hand, a user with larger fingers, a user that uses a larger surface of a finger, or the like, will be sensed by the touchscreen 180 in conjunction with the processor 114 as having a larger physical contact surface. Moreover, the touchscreen 180 in conjunction with the processor 114 may be configured to determine a more exact, an average, a median, or the like physical contact surface in order to determine how the user physically touches the touchscreen 180. Similarly, a user who has a tendency to bounce their finger on or across the surface of the touchscreen 180, drag and/or slide their finger on the touchscreen 180 may be sensed as having a larger physical contact area.

Figure 2:
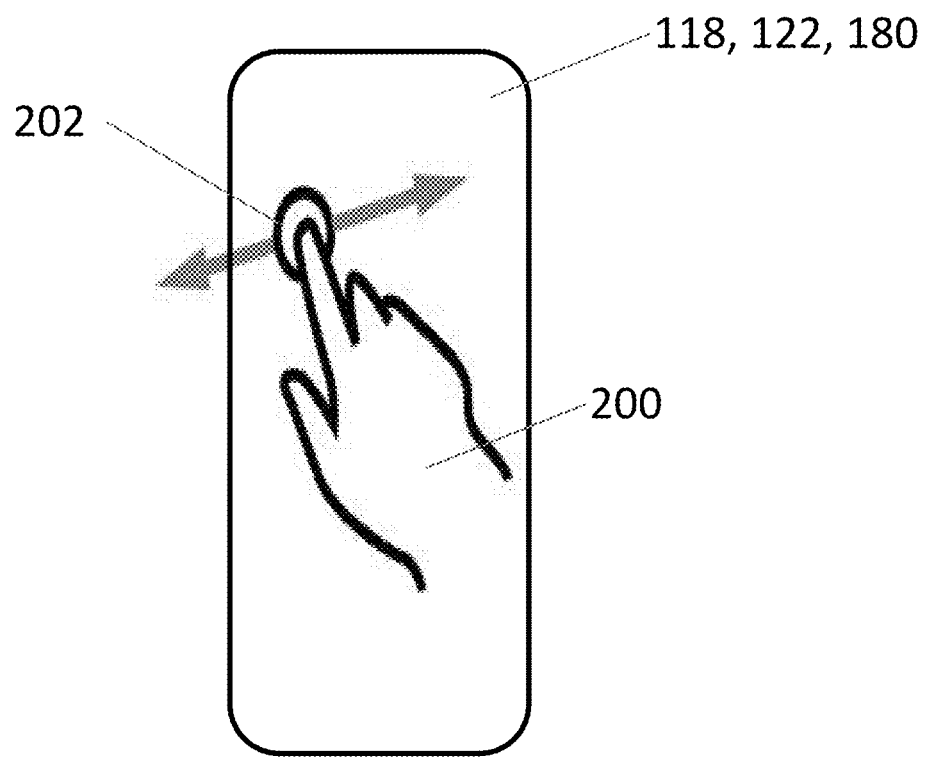
FIG. 2 shows a user with a smaller hand using the electronic device in accordance with aspects of the invention.
Figure 3:
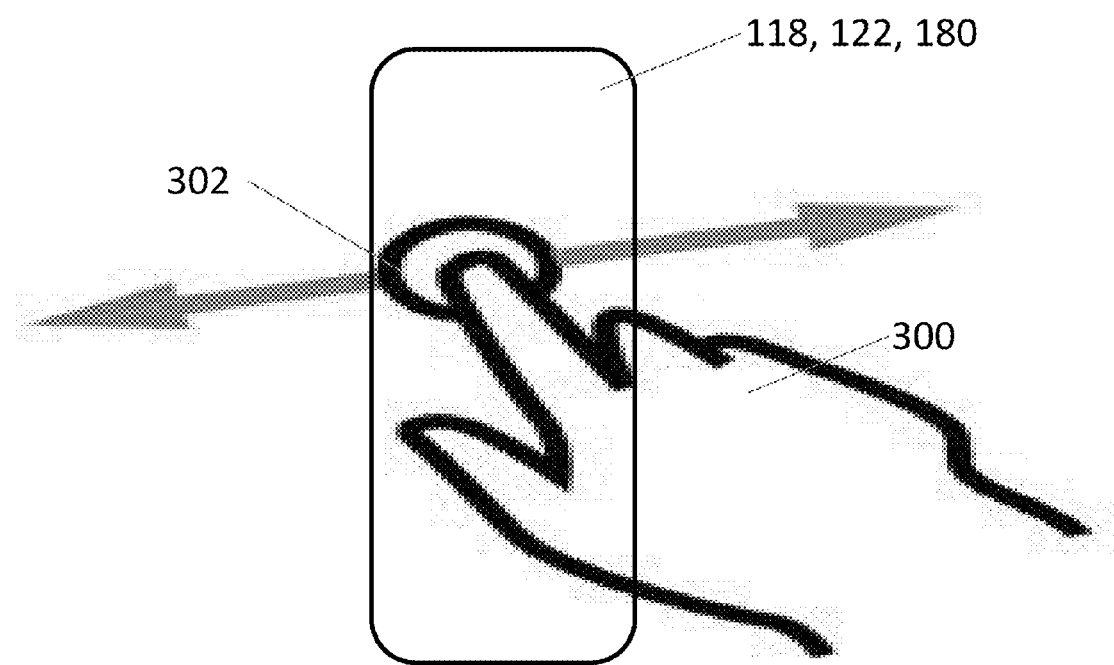
FIG. 3 shows a user with a larger hand using the electronic device in accordance with aspects of the invention.

FIG. 2 shows a user with a smaller hand using the electronic device in accordance with aspects of the invention; and FIG. 3 shows a user with a larger hand using the electronic device in accordance with aspects of the invention. In particular, FIG. 2 and FIG. 3 show aspects where the invention may be beneficial for users with different size hands. FIG. 2 shows a user hand 200 that is average sized or smaller than average sized. The resulting physical contact surface 202 on the display 118, user interface 122, and touchscreen 180 is of a first size. On the other hand, FIG. 3 shows a user hand 300 that is larger than average. The resulting physical contact surface 302 on the display 118, user interface 122, and touchscreen 180 is of a second larger size than the first size. The processor 114 is configured to capture the size of the physical contact area using the touchscreen 180 in conjunction with the contact/motion component 152. In this regard, the processor 114 may collect data over numerous interactions with the user and the touchscreen 180 and determine that the user has a particular physical contact area when interacting with the touchscreen 180. Again, the physical contact area not being limited to the users hand size, but including the physical contact area which includes the portion of the finger used by the user, bouncing of a finger, sliding a finger, use of a stylus, or the like. This registered contact area may be used to subsequently determine the various interface aspects of the electronic device 104 so as to be more beneficial for the user and provide the user with a more enjoyable experience with electronic device 104.

In the initial configuration of the electronic device 104, the objects 190 may be displayed on the user interface 122 based on a default setting or manufacturers' setting. During the evolutionary process, objects 190 (icons, applications, context, and the like) may be reconfigured in an evolutionary schema either on different screens or on the same screen. Furthermore, the evolutionary process may include a change of size, color, arrangement, font attributes, shape, shape attributes, and the like of the objects 190 on the display 118 based on user's behaviors and physical properties of a person.

The evolutionary process may operate without user interaction and be finished before user substantially operates the device. On the other hand, the evolutionary process may operate continuously without user interaction. Moreover, the evolutionary process may operate on a predefined schedule from time to time or in an ad hoc manner as determined by the processor 114. The operating parameters of the evolutionary process may be set by a user, set by the manufacturer, or the like.

The evolutionary process dramatically eases the user interaction, reduces the operation time, and allows a user to have a more enjoyable experience with the electronic device 104. The electronic device 104 may execute the evolutionary configuration process so that objects 190 (icons, applications, context, and the like) can be reorganized in evolutionary schema either on different screens or on the same screen. The evolutionary process can also cover multiple pages. Additionally, the evolutionary process may be limited by the user of the electronic device 104 to not affect certain objects 190, affect certain aspects, change only certain aspects, and the like.

Figure 4:
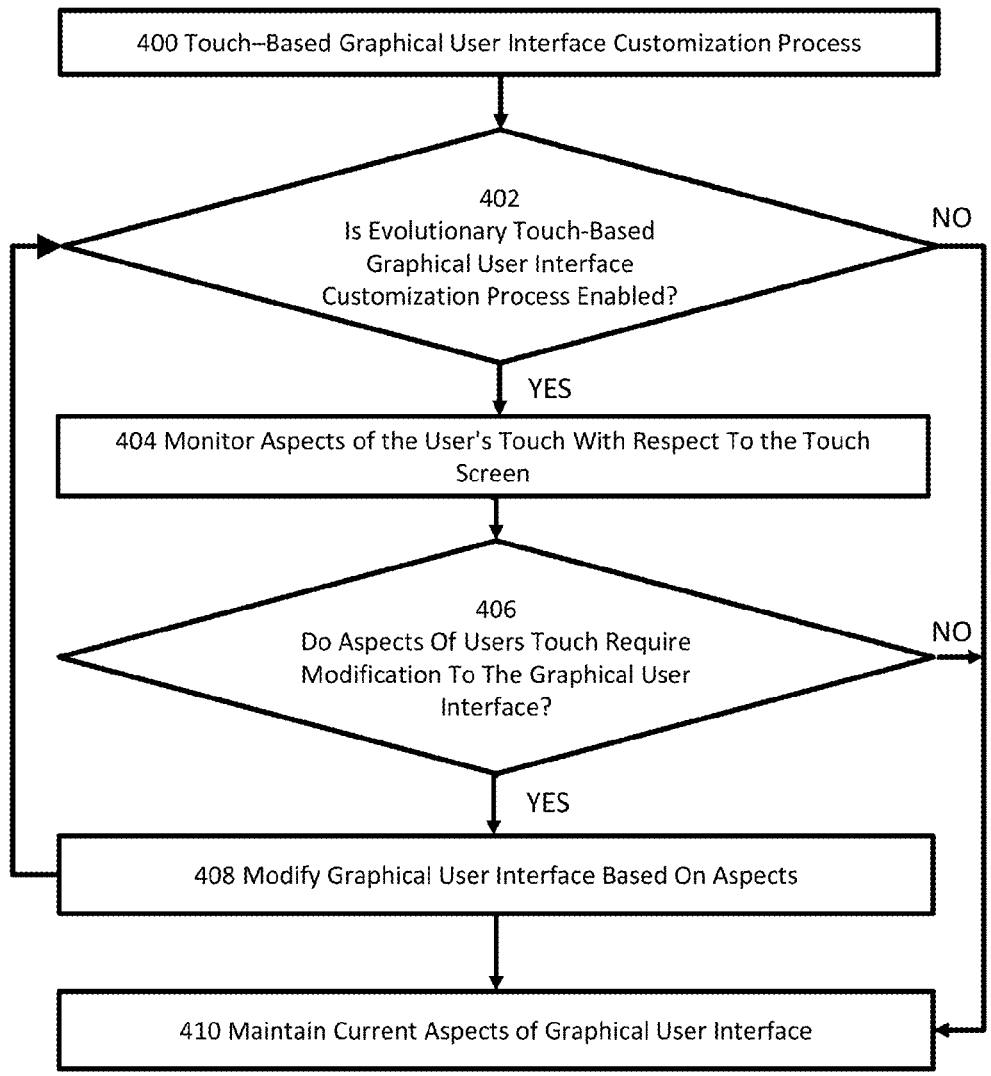
FIG. 4 shows an evolution-based process of customizing the graphical user interface in accordance with aspects of the invention.

FIG. 4 shows an evolution-based process of customizing the graphical user interface in accordance with aspects of the invention. In particular, FIG. 4 shows a touch-based graphical user interface customization process 400. This process 400 may include an initial determination 402 whether or not the evolutionary touch-based customization process 400 is enabled. In this regard, the process 400 may be set by the factory to be initially enabled so that a user need not take any action in order to benefit from the process 400 operating and improving the graphical user interface for the user. The electronic device 104 may include the ability to disable the process 400 if a user determines that they do not want to benefit from the customization process 400. On the other hand, the electronic device 104 may be set by the factory to be disabled. In that case, the user must take affirmative steps with electronic device 104 in order to enable the customization process 400. When the customization process 400 is enabled, the process will move to process 404; and when the customization process is not enabled the process may advance to process 410.

In process 404, the electronic device 104 and the processor 114 may monitor various aspects of the user with respect to touchscreen 180. For example, the electronic device 104 and processor 114 may monitor the size of the touch of the user, as described above, and determine the touch size for further implementation within process 400. In a particular aspect, the size of the touch of the user may be measured based on an output of the touchscreen 180 and stored in the memory 116. After a predetermined number of measurements, the average size of the user's touch may be calculated in the processor 114. Other aspects are contemplated for monitoring as well such as those described below.

In process 406, the various aspects that were monitored in process 404 may be compared to the currently selected aspects. If the monitored aspects are not substantially equivalent to the currently selected aspects, the process 406 may determine that modification is required and advance to process 408. If on the other hand, the monitored aspects are substantially equivalent to the currently selected aspects, then the process 406 may advance to process 410. For example, if the monitored aspects are the size of touch of a user and the previously selected aspects of user touch size are substantially equivalent to the monitored size touch of a user, then the process will advance to process 410, and otherwise may advance to process 408. More specifically, the measured average size touch of the user determined in process 404 may be compared to a previously determined measured average size touch of the user. The previously determined average size touch of the user having been stored in memory 116. A predetermined variance may be included in the comparison process between the current determined average size touch and the previous measured average size touch in order to prevent overburdening the processor 114.

In process 408, the processor 114 may modify the aspects of the display 118, user interface 122, touchscreen 180 and/or objects 190 to be consistent with the monitored aspects of the user as determined in process 406. For example, if the monitored aspects are the size of touch of a user, and the previously determined size touch of the user is smaller, then the objects 190 may be increased in size to be consistent with the monitored aspects as determined in process 406. Likewise, if the monitored average size touch of the user has decreased with respect to the previously determined average size touch of the user, the objects 190 may be decreased in size.

In process 410, if the evolutionary touch-based graphical user interface customization process 400 was not enabled, set forth in process 402, or the aspects of users touch did not require modification as set forth in process 406, then in process 410 the current aspects of the graphical user interface may be maintained and no change will be made. For example, if the process 400 is operated numerous times and the user behavior has not changed, then the aspects of the graphical user-interface may also not be changed.

Object Size

Accordingly, the process 400 may allow the electronic device 104 to execute the evolutionary process so as to change the user interface objects 190 to different sizes. The different sizes may include the size of objects 190, size of the icons, the size of applications, and size of any fonts. The upper and lower limitations on the size of objects 190 may be preset in the electronic device 104. Additionally, the upper and lower limitations on the size of objects 190 may be set by the user in the electronic device 104.

Object Location

Another aspect that may be modified using the process 400 may be the locations of various objects 190. In this regard, the aspect monitored in process 404 may be the frequency of use of various objects 190. If certain objects 190 are used with greater frequency, the process step 408 may modify the graphical user interface to position the objects 190 used with higher frequency on a first screen of the touchscreen 180. Objects 190 that are used with less frequency may be placed on subsequent screens of the touchscreen 180. Furthermore, if there are more than two screens, each screen may have objects 190 of the similar frequency. For example, high-frequency use objects 190 on a first screen, medium frequency use objects 190 on a second screen, and lower frequency use objects 190 on a third and subsequent screens.

Alternatively, the position of high frequency use objects 190 may be changed on any given screen. For example, high-frequency use objects 190 may be positioned at a more convenient location such as the top or center of the touchscreen 180 in process 400.

Similarly, high-frequency use objects 190 may be assigned a different color in process 400. In this regard, the different color objects 190 may assist the user in finding and using objects 190 quicker and easier. Similarly, the shape of the object 190 may also be modified using process 400.

Furthermore, the various frequency of use aspects may be determined based on a time of day. For example, morning, noon, afternoon, or evening may be separately analyzed and processed in process 404 and process 406 and subsequently modified in process 408 based on the time of day. In subsequent use of electronic device 104, each of these times a day may have a different graphical user interface and presentation of objects 190.

Additional Sensor

The process 400 may further include a configuration having an additional sensor to assist in object evolution. The additional sensor can enhance the accuracy of the process 400. The additional sensor can be associated with the touchscreen 180.

Additional aspects contemplated to be modified by the invention include the background color of a screen, the background color of a portion of a screen, background color of the touchscreen 180, or the like. For example, the portion of a screen or a screen containing high-frequency use objects 190 may have a color with a greater contrast to focus the user's attention on that particular portion. On the other hand, the background color can be pre-defined or randomly set by the electronic device 104. Additionally, the process 400 may modify the background color located around a high-frequency use object 190 or an interface of the high-frequency use object 190. For example, the shape on the boundary of high-frequency use object 190 can be configurable to distinguish it from a lower frequency use objects 190. In a similar approach, the shape of a high-frequency use object 190 may be modified such as to be a square or circular based on the implementation of the process 400.

Figure 5:
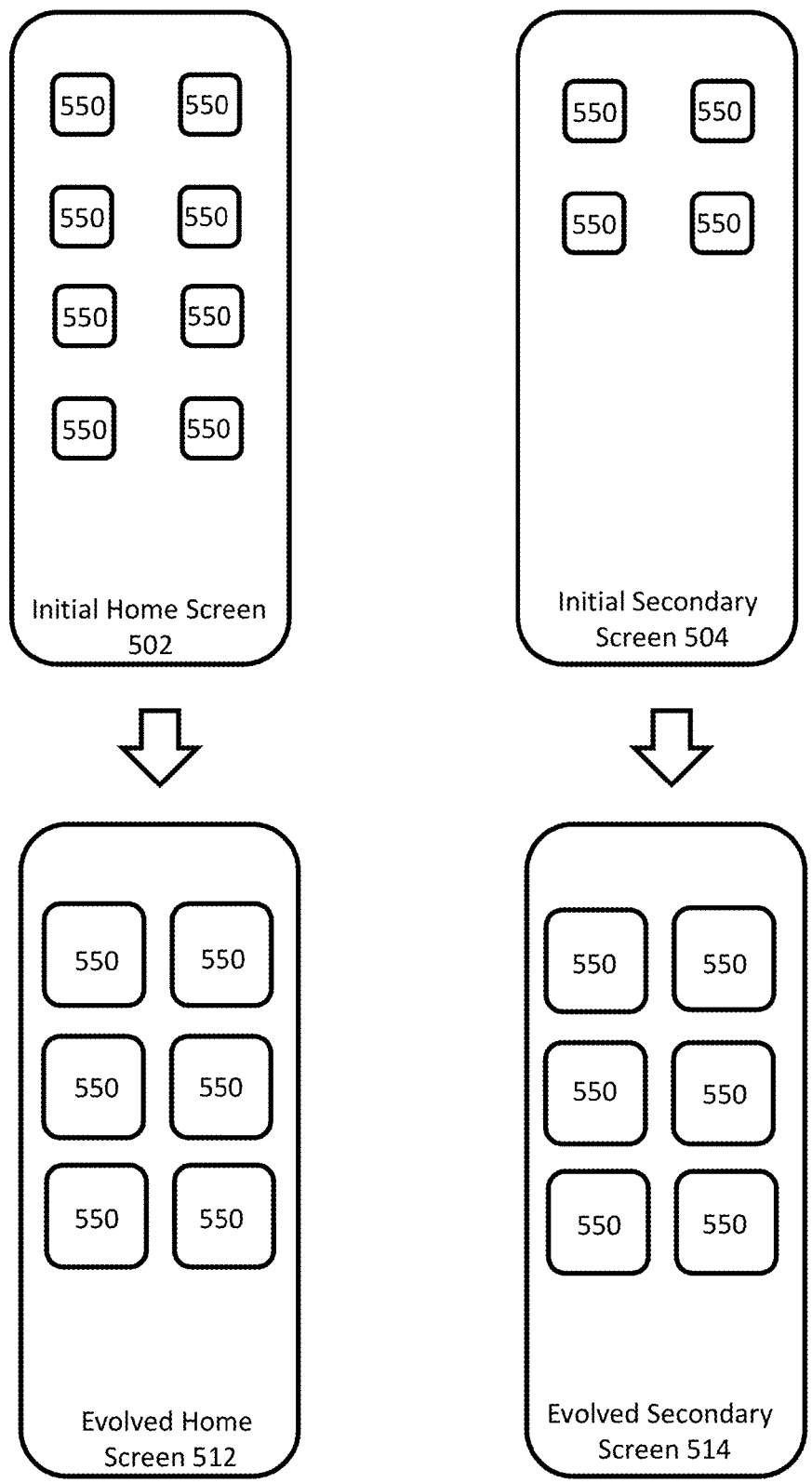
FIG. 5 shows an example of the evolution-based process of customizing the graphical user interface in accordance with aspects of the invention.

FIG. 5 shows an example of the evolution-based process of customizing the graphical user interface in accordance with aspects of the invention. In particular, FIG. 5 shows an initial home screen 502 together with an initial secondary screen 504. The initial home screen 502 and the initial secondary screen 504 may have objects 550 having a size set by the manufacturer of the electronic device 104. After the touch-based graphical user interface customization process 400 is implemented one or more times, the process 400 may determine in this particular example that the users touch is larger. In response to this determination of a larger touch, the process 400 may generate an evolved home screen 512 and evolved secondary screen 514. The evolved home screen 512 and evolved secondary screen 514 may have objects 550 that are larger in size. Note due to the larger size objects 550 that the process 400 may move the objects from the evolved home screen 512 to the evolved secondary screen 514 to accommodate the larger size.

Figure 6:
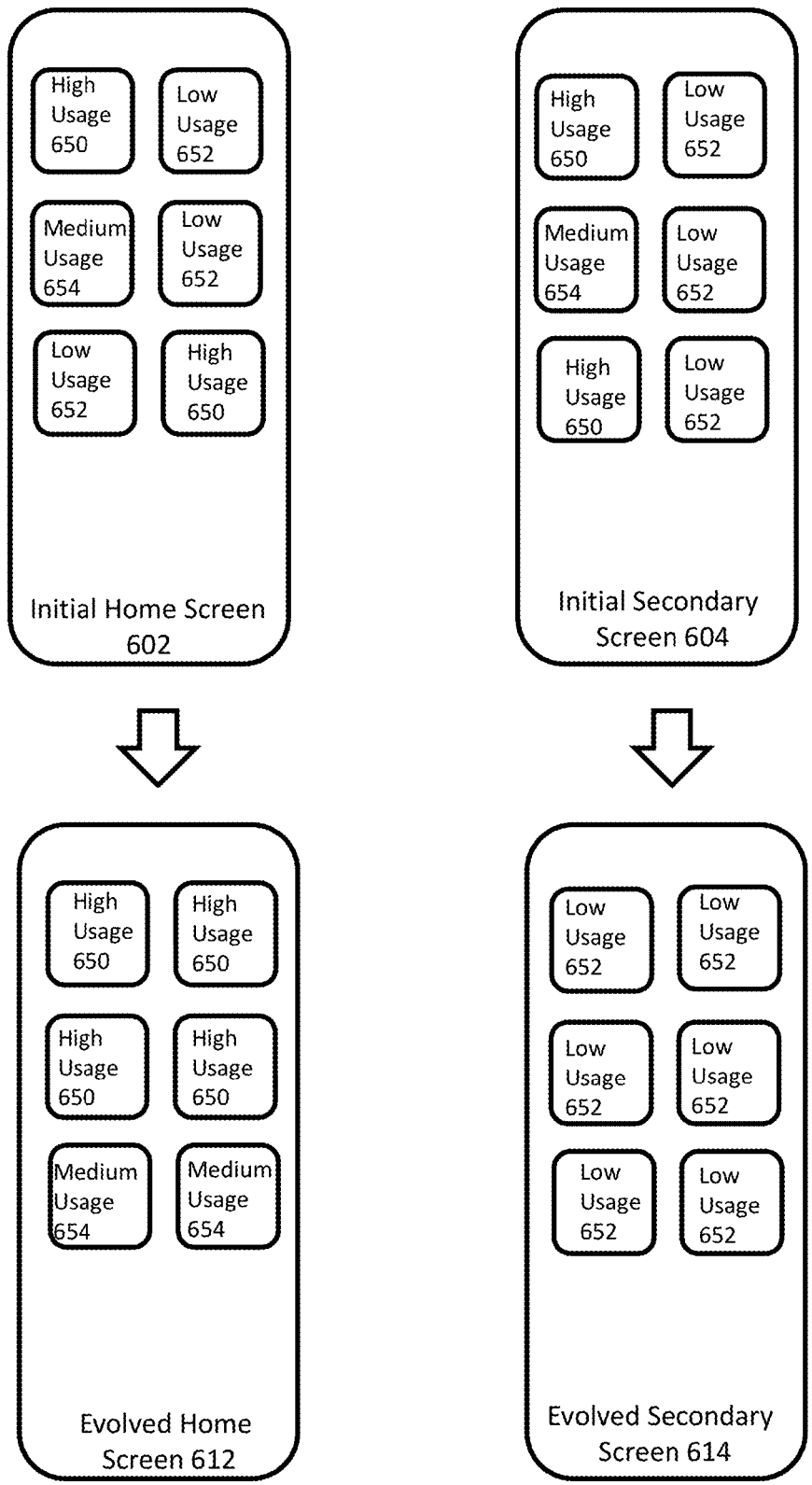
FIG. 6 shows an example of the evolution-based process of customizing the graphical user interface in accordance with aspects of the invention.

FIG. 6 shows an example of the evolution-based process of customizing the graphical user interface in accordance with aspects of the invention. In particular, FIG. 6 shows an initial home screen 602 together with an initial secondary screen 604. The initial home screen 602 and the initial secondary screen 604 may have objects 650, 652, 654. The objects 650 may be objects that are used by the user a high percentage of the time; objects 652 may be objects that are used by the user a low percentage of the time; and objects 654 may be objects that are used a medium percentage of the time. After the touch-based graphical user interface customization process 400 is implemented one or more times, the process 400 may determine high usage objects 650, low usage objects 652, and medium usage objects 654. In response to this determination, the process 400 may generate an evolved home screen 612 and evolved secondary screen 614. The evolved home screen 612 and evolved secondary screen 614 may have high usage objects 650 on the evolved home screen 612. Moreover the high usage objects 650 may be positioned higher on the screen. The medium usage objects 654 may be positioned on the evolved home screen 612 at a lower position. Finally, the low usage objects 652 may be positioned on the evolved secondary screen 614.

Additionally, once the touch-based graphical user interface customization process 400 has resized the objects 190 (550), such as shown in FIG. 5, the user may still desire to modify the size of the objects 190 (550). In this regard, the touchscreen 180 may allow a user to manipulate the objects 190 (550) to increase or decrease the size of the objects 190 (550) based on a further touch. For example, the user may manipulate the touchscreen 182 to enter a resizing configuration. During this resizing configuration, the user then can manipulate a particular object 190 (550) to increase or decrease its size. Alternatively, in a different resizing configuration the user interaction can manipulate all of the objects 190 (550) at one time to increase or decrease their sizes. Accordingly, this aspect allows a user to further customize the objects 190 (550) as desired.

Accordingly, the system and process described above customizes aspects of a touch-based graphical user interface of an electronic devices based on use of the electronic device by a user. The result is that the electronic device is customized easily in a manner that provides the most efficient, beneficial, and/or enjoyable experience with the electronic device.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

In an embodiment, the invention may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the invention, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. An electronic device having a customizable interface comprising:

a processor configured to execute instructions;

a display device configured to generate an interface based in part in response to the processor, wherein the display device is further configured to generate the interface to display a plurality objects;

a touch screen associated with the display device and configured to sense a user input with respect to the plurality of objects, wherein the input is provided to the processor;

a memory configured to store the instructions to operate the electronic device;

the processor further configured to determine a frequency of an interaction with each of the plurality objects displayed on the touch screen based on the time of day, the processor further configured to modify a manner in which the plurality objects are displayed on the display device based on the time of day and based on a determination of the frequency of interaction with the plurality of objects based on the time of day, wherein modifying a manner in which the plurality objects are displayed comprises modifying a size of the object;

wherein the plurality of objects comprise applications;

wherein the display device is further configured to display multiple screens, with only one screen visible at a given time, the display further configured to display a portion of the plurality of objects on each of the multiple screens;

wherein the modification of the manner in which the plurality of objects are displayed further comprises modifying at least a position of the object from one of the multiple screens to another one of the multiple screens based on the time of day and based on the frequency of interaction with the plurality of objects; and wherein the processor is further configured to maintain a manner in which the plurality objects are displayed on the display device based on the determination of the frequency of interaction with the plurality of objects based on the time of day has not changed with respect to a previous determination of the frequency of interaction with the plurality of objects based on the time of day.

2. The electronic device according to claim 1 wherein the frequency of interaction with the plurality of objects determined by the processor comprises determining a frequency of use of each object of the plurality of objects.

3. The electronic device according to claim 1 wherein the modification of the manner in which the plurality of objects are displayed further comprises modifying a background color of one of the multiple screens based on the frequency of interaction with the plurality of objects to be different from a background color of another one of the multiple screens.

4. The electronic device according to claim 1 wherein the modification of the manner in which the plurality of objects are displayed further comprises modifying a position of the object on one of the multiple screens based on the frequency of interaction with the plurality of objects.

5. The electronic device according to claim 1 wherein the modification of the manner in which the plurality of objects are displayed further comprises modifying a background screen color of the object based on the frequency of interaction with the plurality of objects such that the background screen color of the plurality of objects has a greater contrast for the plurality of objects having a higher frequency of interaction with respect to a contrast for the plurality of objects having a lower frequency of interaction.

6. The electronic device according to claim 1 wherein the processor is configured to not change the manner in which the plurality of objects are displayed based on a determination that a user has disabled the customizable interface aspects of the processor; and wherein the processor is further configured to maintain a manner in which the plurality objects are displayed on the display device after the determination that the user has disabled customizable interface aspects of the processor.

7. The electronic device according to claim 1 wherein the electronic device further comprises at least one of an audio input device, audio output device, power supply, touchscreen controller, and a transceiver.

8. A process of customizing an interface of an electronic device comprising:

generating an interface on a display device and further generating on the interface a plurality objects;

sensing a user input on a touch screen associated with the display device with respect to the plurality of objects;

storing instructions to operate the electronic device in a memory;

determining a frequency of an interaction with each of the plurality objects displayed on the touch screen based on the time of day;

modifying a manner in which the plurality objects are displayed on the display device based on the time of day and based on a determination of the frequency of interaction with the plurality of objects based on the time of day, wherein the modifying comprises modifying a size of the object; and displaying multiple screens, with only one screen visible at a given time, wherein the displaying displays a portion of the plurality of objects on each of the multiple screens;

wherein the plurality of objects comprise applications;

wherein the modifying comprises modifying a position of the object from one of the multiple screens to another one of the multiple screens based on the time of day and based on the determining the frequency of the interaction with each of the plurality of objects displayed on the touch screen; and wherein the modifying comprises maintaining a manner in which the plurality objects are displayed on the display device based on the determination of the frequency of interaction with the plurality of objects based on the time of day has not changed with respect to a previous determination of the frequency of interaction with the plurality of objects based on the time of day.

9. The process of customizing an interface of an electronic device according to claim 8 wherein the frequency of interaction with the plurality of objects comprises determining a frequency of use of each object of the plurality of objects.

10. The process of customizing an interface of an electronic device according to claim 8 wherein the modifying comprises modifying a background screen color of the object based on the determining the frequency of the interaction with each of the plurality of objects displayed on the touch screen such that the background screen color of the plurality of objects has a greater contrast for the plurality of objects having a higher frequency of interaction with respect to a contrast for the plurality of objects having a lower frequency of interaction.

11. The process according to claim 8 wherein the modifying the manner in which the plurality of objects are displayed further comprises modifying a background color of one of the multiple screens based on the frequency of interaction with the plurality of objects to be different from a background color of another one of the multiple screens.

12. The process according to claim 8 wherein the modified manner in which the plurality of objects are displayed further comprises modifying a position of the object on one of the multiple screens based on the frequency of interaction with the plurality of objects.

13. An electronic device having a customizable interface comprising:
  means for generating an interface on a display device and for further generating on the interface a plurality objects;
  means for sensing a user input on a touch screen associated with the display device with respect to the plurality of objects;
  means for storing instructions to operate the electronic device in a memory;
  means for determining a frequency of an interaction with each of the plurality objects displayed on the touch screen based on the time of day;
  means for modifying a manner in which the plurality objects are displayed on the display device based on the time of day and based on a determination of the frequency of interaction with the plurality of objects, wherein the means for modifying modifies a size of the object,
  wherein the plurality of objects comprise applications;
  wherein the display device is further configured to display multiple screens, with only one screen visible at a given time, the display further configured to display a portion of the plurality of objects on each of the multiple screens;
  wherein the means for modifying further modifies a position of the object from one of the multiple screens to another one of the multiple screens based on the time of day and based on the determining the frequency of the interaction with each of the plurality objects displayed on the touch screen; and
  wherein the means for modifying comprises maintaining a manner in which the plurality objects are displayed on the display device based on a determination of the frequency of interaction with the plurality of objects based on the time of day has not changed with respect to a previous determination of the frequency of interaction with the plurality of objects based on the time of day.

14. The electronic device according to claim 13 wherein the frequency of interaction with the plurality of objects determined by the means for determining comprises a frequency of use of each object of the plurality of objects.

15. The electronic device according to claim 13 wherein the means for modifying further modifies a background screen color of the object based on the determining the frequency of the interaction with each of the plurality objects displayed on the touch screen such that the background screen color of the plurality of objects has a greater contrast for the plurality of objects having a higher frequency of interaction with respect to a contrast for the plurality of objects having a lower frequency of interaction.

16. The electronic device according to claim 13 wherein the means for modifying the manner in which the plurality of objects are displayed further comprises modifying a background color of one of the multiple screens based on the frequency of interaction with the plurality of objects to be different from a background color of another one of the multiple screens.

17. The electronic device according to claim 13 wherein the means for modifying the manner in which the plurality of objects are displayed further comprises modifying a position of the object on one of the multiple screens based on the frequency of interaction with the plurality of objects.

* * * * *